J. W. Willson,
Elevator.
Nº 5,828.   Fig.1.   Patented Oct. 3, 1848.
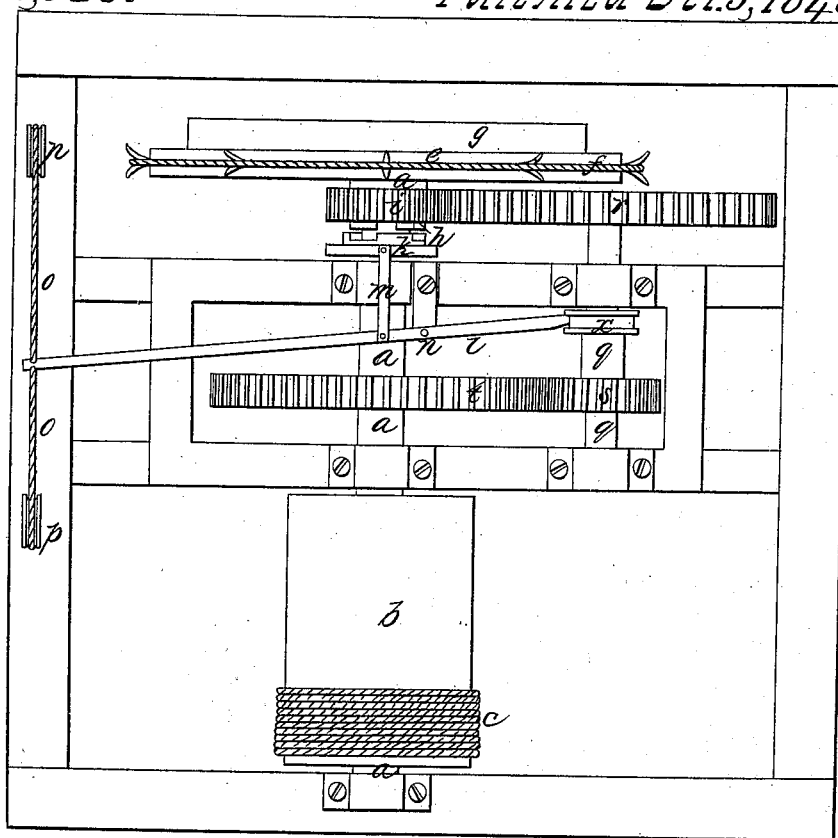
Fig. 2.
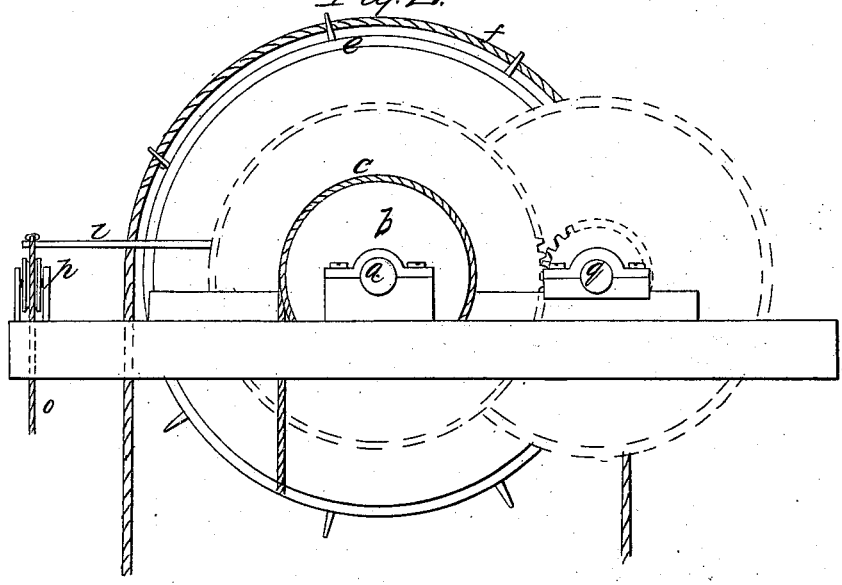

UNITED STATES PATENT OFFICE.

J. WARD WILLSON, OF SYRACUSE, NEW YORK.

MACHINE FOR HOISTING.

Specification of Letters Patent No. 5,828, dated October 3, 1848.

*To all whom it may concern:*

Be it known that I, J. WARD WILLSON, of Syracuse, in the county of Onondaga and State of New York, have invented certain new Improvements in the Fall for Hoisting Heavy Bodies, and that the following is a full, clear, and exact description of the principle or character which distinguishes them from all other things before known and of the usual manner of making, modifying, and using the same, reference being had to the accompanying drawings, which form a part of the same, in which—

Figure 1, is a plan, Fig. 2, an end elevation of the apparatus.

The same letters refer to like parts in both the figures.

The nature of my improvement consists in the method of changing the power of a fall for hoisting heavy bodies in warehouses and other similar places, from a single wheel and axle to a double gear, by which any amount of power can be obtained in a much less space than has heretofore been done, while the facility of operation is greatly increased, and the shifting readily done on any story where the person hoisting stands.

The construction is as follows: On an axle $a$ supported by a suitable frame-work there is a drum $b$, on which the hoisting rope or chain $c$ is wound, and on the same axle there is a short sleeve $d$, on the outer end of which the fly wheel $e$ is fastened; on the periphery of this wheel are V shaped projections that support the endless cord or chain $f$, which serves as the handrope to hoist by; beside this hoisting rim there is another $g$, smaller, for the ordinary friction brake; the inner end of the sleeve has a clutch $h$, formed on it, and between the clutch and the wheel $e$ there is a spur pinion $i$, the whole being connected and turning loosely on the axle $a$; a clutch $k$ that takes into that on the sleeve is fastened to the axle $a$ with the ordinary feather, and is moved by a lever $l$, with which it is connected by the rod $m$; the fulcrum of this lever is at $n$, and it is moved by two cords $o$ attached to the end of its long arm, which pass over pulleys $p$ on each side of it, and thence the cords $o$ pass down through any number of stories, and by them the lever can be moved either way, and throw the clutch in or out of connection with that on the sleeve, so as to unite it with the axle, or disengage it; parallel with the axle above described there is another $q$, on which there is a spur wheel $r$ that gears into the pinion $i$, and beyond it on the same axle a pinion $s$, which gears into a spur wheel $t$ on the main axle $a$.

The axle $q$ has an end chase sufficient to throw the wheel and pinion on it out of gear with those on the sleeve and axle $a$, and it is moved by an extension of the lever $l$ beyond its fulcrum that is connected with a collar $x$ on said shaft for that purpose; by this combination of parts the wheels and pinions are thrown into gear at the same time that the sleeve is unclutched, and vice versa, so that the wheel is never out of connection with the hoisting drum, nor can the apparatus be moved till the gear is brought entirely into place or clear of each other, for the clutches and gear both hold till both are brought home to their places; by this arrangement of parts I insure a perfect action and great facility in hoisting; for instance, if heavy bodies are to be raised into an upper story of the building, in which the fall is situated, the gearing is put in connection for that purpose; and when it is hoisted and deposited, the gear is instantly thrown out, and the rope lowered with a rapidity equal to the single wheel and axle; the gear is then again thrown in for a second heavy hoist, and all this is managed by the person at the fall rope. The space that the whole occupies is about four feet, and the handropes are only about three feet apart.

Having thus fully described my improvements, what I claim therein as new, and desire to secure by Letters Patent, is—

The combination of the clutch and gear, substantially as herein described, so that the fly-wheel and drum shall never be out of connection for the purpose described.

J. WARD WILLSON.

Witnesses:
WM. H. BISHOP,
J. J. GREENOUGH.